US011232230B1

(12) United States Patent
Mudgil et al.

(10) Patent No.: US 11,232,230 B1
(45) Date of Patent: Jan. 25, 2022

(54) DATA SECURITY FOR A DOCUMENT MANAGEMENT SYSTEM

(71) Applicant: Tekion Corp, San Ramon, CA (US)

(72) Inventors: Satyavrat Mudgil, Bengaluru (IN); Anant Sitaram, San Ramon, CA (US); Fahad Tasleem, Najibabad (IN); Ved Surtani, Bengaluru (IN)

(73) Assignee: Tekion Corp, Pleasanton, CA (US)

( * ) Notice: Subject to any disclaimer, the term of this patent is extended or adjusted under 35 U.S.C. 154(b) by 0 days.

(21) Appl. No.: 17/234,353

(22) Filed: Apr. 19, 2021

(51) Int. Cl.
*G06F 21/62* (2013.01)
*G06F 16/23* (2019.01)

(52) U.S. Cl.
CPC ...... *G06F 21/6245* (2013.01); *G06F 16/2343* (2019.01); *G06F 21/6227* (2013.01)

(58) Field of Classification Search
CPC ............. G06F 21/6245; G06F 16/2343; G06F 21/6227

USPC ......................................................... 726/26
See application file for complete search history.

(56) References Cited

U.S. PATENT DOCUMENTS

2021/0141920 A1\* 5/2021 Khurana ............... G06F 16/168

\* cited by examiner

*Primary Examiner* — Jeffrey C Pwu
*Assistant Examiner* — Nega Woldemariam
(74) *Attorney, Agent, or Firm* — Fenwick & West LLP

(57) ABSTRACT

A document management system manages documents of an enterprise. The documents are managed in a secure manner such that access to entries included in the documents may be restricted according to a security policy associated with the documents. The document management system may secure documents such that entries are still provided to users that request the documents, but sensitive data included in the entries is masked according to the security policies for the documents.

20 Claims, 11 Drawing Sheets

Journal Entries

Create Journal Entry

Journal Name: Journal 1    Date Range Sept 01, 2020 – Dec 05, 2020    432 Results    Search

| | Status | ID | Type | Date | Reference | Description | Value | Created By | Journal No. |
|---|---|---|---|---|---|---|---|---|---|
| ☐ | Posted | 123 | Type 1 | 11/30/20 | Reference 1 | XYX | 1234 | John Doe | Journal 1 |
| ☐ | Posted | 122 | Type 2 | 11/30/20 | Reference 1 | ADJB | 5498 | John Doe | Journal 1 |
| ☐ | Posted | 121 | Type 3 | 11/30/20 | Reference 1 | SGDA | 8746 | John Doe | Journal 1 |
| ☐ | Posted | 120 | Type 2 | 11/30/20 | Reference 1 | DAGD | 4811 | John Doe | Journal 1 |
| ☐ | Posted | 119 | Type 2 | 11/30/20 | Reference 1 | DGSG | 9887 | John Doe | Journal 1 |
| ☐ | Posted | 118 | Type 3 | 11/30/20 | Reference 2 | JJLFD | 2487 | John Doe | Journal 1 |
| ☐ | Posted | 117 | Type 1 | 11/30/20 | Reference 2 | NNOHI | 7891 | John Doe | Journal 1 |
| ☐ | Posted | 116 | Type 1 | 11/30/20 | Reference 2 | GHRE | 18544 | John Doe | Journal 1 |
| ☐ | Posted | 115 | Type 3 | 11/30/20 | Reference 2 | HFNRR | 9987 | John Doe | Journal 1 |
| ☐ | Posted | 114 | Type 1 | 11/29/20 | Reference 3 | NRER | 777 | John Doe | Journal 1 |

Journal Entry - 553549

General Information

Enterprise: Enterprise 1

Document Type: Type 1

Reference Type: Reference Type 1

Journal Number/Name: Journal 1

Description: Type here

Reference: Reference Number

Posting Lines

| Data Type 1: Value | Data Type 2: Value | Data Type 3: Value |
|---|---|---|
| Identifier | Value | Description |
| Identifier 1 | Value 1 | Description 1 |
| Identifier 2 | Value 3 | Description 2 |
| Identifier 3 | Value 4 | Description 3 |

Journal Entries 300

Journal Name: Journal 1   Date Range Sept 01, 2020 – Dec 05, 2020   432 Results   Search   Create Journal Entry

| | Status | ID | Type | Date | Reference | Description | Value | Created By | Journal No. |
|---|---|---|---|---|---|---|---|---|---|
| ☐ | Posted | 🔒 | Type 1 | 11/30/20 | Reference 1 | 🔒 | 🔒 | 🔒 | Journal 1 |
| ☐ | Posted | 🔒 | Type 2 | 11/30/20 | Reference 1 | 🔒 | 🔒 | 🔒 | Journal 1 |
| ☐ | Posted | 🔒 | Type 3 | 11/30/20 | Reference 1 | 🔒 | 🔒 | 🔒 | Journal 1 |
| ☐ | Posted | 🔒 | Type 2 | 11/30/20 | Reference 1 | 🔒 | 🔒 | 🔒 | Journal 1 |
| ☐ | Posted | 🔒 | Type 2 | 11/30/20 | Reference 2 | 🔒 | 🔒 | 🔒 | Journal 1 |
| ☐ | Posted | 🔒 | Type 3 | 11/30/20 | Reference 2 | 🔒 | 🔒 | 🔒 | Journal 1 |
| ☐ | Posted | 🔒 | Type 1 | 11/30/20 | Reference 2 | 🔒 | 🔒 | 🔒 | Journal 1 |
| ☐ | Posted | 🔒 | Type 1 | 11/30/20 | Reference 2 | 🔒 | 🔒 | 🔒 | Journal 1 |
| ☐ | Posted | 🔒 | Type 3 | 11/30/20 | Reference 2 | 🔒 | 🔒 | 🔒 | Journal 1 |
| ☐ | Posted | 🔒 | Type 1 | 11/29/20 | Reference 3 | 🔒 | 🔒 — 601 | 🔒 | Journal 1 |

FIG. 6

Journal Entry - 553549

General Information

Enterprise: Enterprise 1    Journal Number/Name: Journal 1

Document Type: Type 1    Description: Type here

Reference Type: Reference Type 1    Reference: Reference Number

Posting Lines

Data Value 1: 🔒    Data Type 2: 🔒 — 801B

| Identifier | Value | Description |
|---|---|---|
| Identifier 1 | 🔒 — 801A | Description 1 |
| Identifier 2 | Value 3 | Description 2 |
| Identifier 3 | Value 4 | Description 3 |

FIG. 8

DATA SECURITY FOR A DOCUMENT MANAGEMENT SYSTEM

BACKGROUND

Field of Disclosure

The present disclosure generally relates to a document management system, and more specifically to security of documents managed by the document management system.

Description of the Related Art

Enterprises use a document management system to electronically store data related to the enterprises. The data is stored in one more documents in the document management system. Various users such as employees of the enterprises may have access to the stored data. However, some of the data stored in the documents is sensitive and not all users should have access to the data. Conventional document management systems are unable to secure stored data in manner that prevent users from viewing the sensitive data and reverse-engineering the sensitive data from other data in the document management system.

SUMMARY

In one embodiment, a document management system manages documents of an enterprise. The document management system may secure a document such that access to entries included in the document may be restricted according to a security policy associated with the document. The document management system may secure the document such that a requested entry in the document is still provided to a user, but sensitive data included in the entry is masked according to the security policy for the document.

Masking the sensitive data hides the data from users that are not granted access to the data while still allowing the users to view non-sensitive data in the document. In one embodiment, the document management system masks sensitive data by replacing the sensitive data with a masking element. The masking element visually indicates to the users that access to the sensitive data is restricted. Furthermore, data included in an entry that may be used to reverse engineer the masked data is also masked to prevent the users from determining the values of the masked data.

BRIEF DESCRIPTION OF DRAWINGS

FIG. 3 is an example of an unsecured document according to one embodiment.

FIG. 4 is an example of an unsecured entry in the unsecured document according to one embodiment.

FIG. 5 is an example of a security policy for a document, according to one embodiment.

FIG. 6 is an example of a secured document according to one embodiment.

FIG. 8 is an example of a secured entry in the secured document according to one embodiment.

DETAILED DESCRIPTION

The Figures (FIGS.) and the following description describe certain embodiments by way of illustration only. One skilled in the art will readily recognize from the following description that alternative embodiments of the structures and methods illustrated herein may be employed without departing from the principles described herein. Reference will now be made in detail to several embodiments, examples of which are illustrated in the accompanying figures. It is noted that wherever practicable similar or like reference numbers may be used in the figures and may indicate similar or like functionality.

Document Management System Environment

Figure 1:
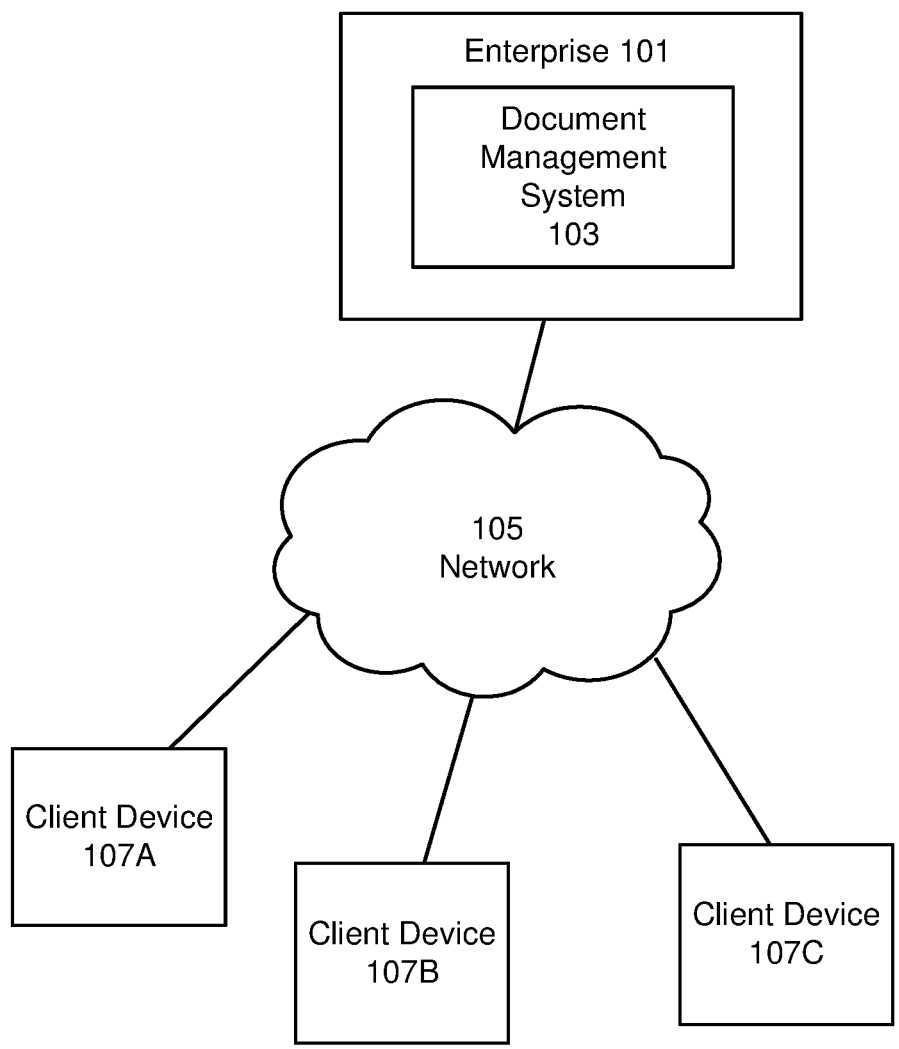
FIG. 1 is a high-level block diagram illustrating an embodiment of an environment for securing documents of an enterprise according to one embodiment.

FIG. 1 is a high-level block diagram illustrating an embodiment of an environment 100 of a document management system 103 for securing documents of an enterprise 101. An example of an enterprise 101 included in the environment is an automobile dealership. However, the enterprise 101 can be any type of entity that requires data security. The documents managed by the document management system 103 may include any type of data related to the enterprise.

Figure 10:
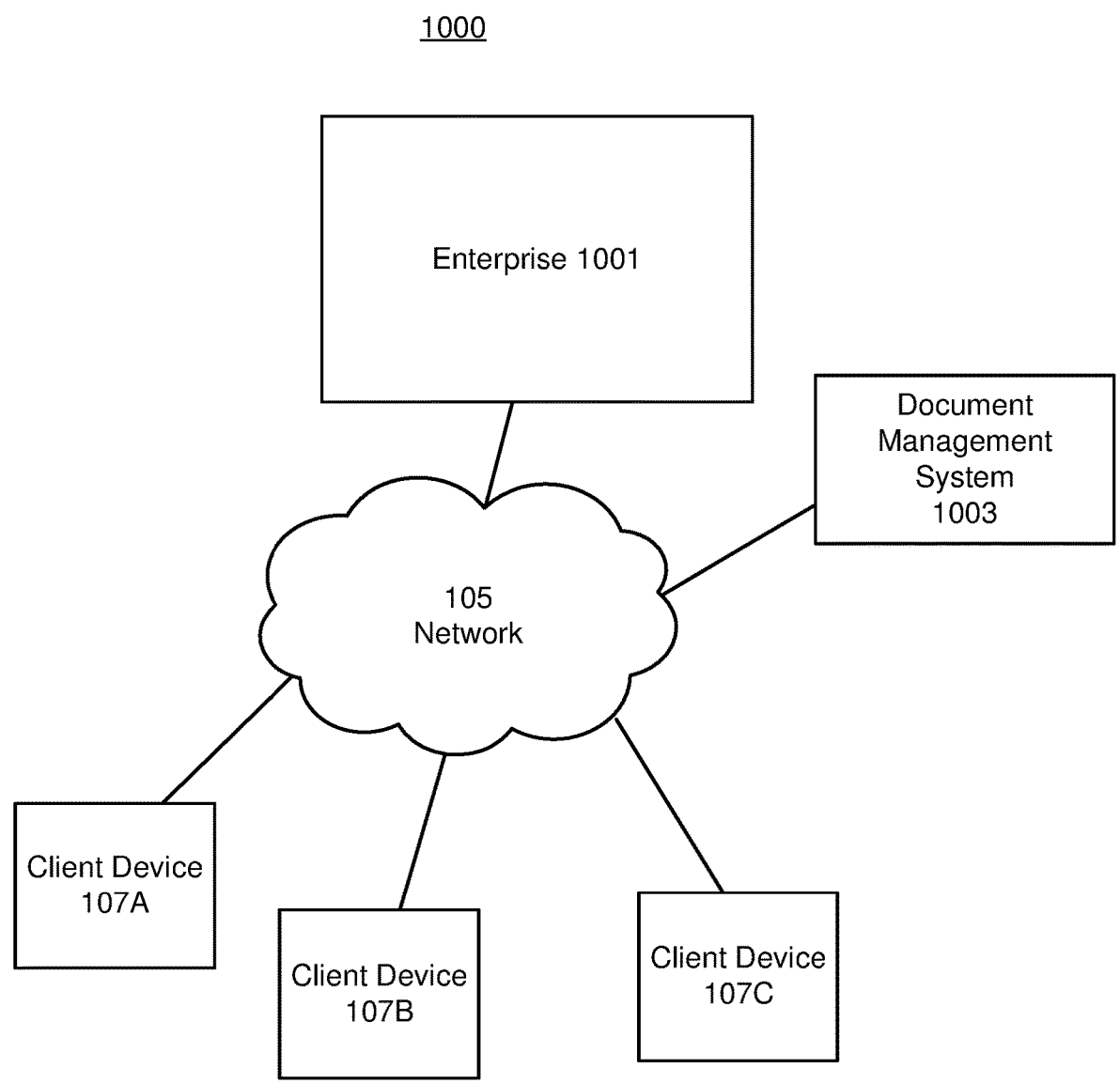
FIG. 10 is a high-level block diagram illustrating another embodiment of an environment for securing documents of an enterprise according to one embodiment

In one embodiment, the environment 100 includes the enterprise 101 and a plurality of client devices 107A to 107C connected to each other via a network 105. As shown in FIG. 1, the enterprise 101 includes a document management system 103. Note that in another embodiment such as shown in FIG. 10, the document management system 103 may be a separate entity from the enterprise 101 as will be further described below with respect to FIG. 10. Any number of document management systems, enterprises, and client devices may be present in other embodiments.

The network 105 provides a communication infrastructure between the entities included in environment 100. The network 105 is typically the Internet, but may be any network, including but not limited to a Local Area Network (LAN), a Metropolitan Area Network (MAN), a Wide Area Network (WAN), a mobile wired or wireless network, a private network, or a virtual private network.

Client devices 107 may include any device having an application that communicates with the document management system 103 of the enterprise 101. For example, a client device 107 may be a mobile device or personal computer. Generally, client devices 107 represent devices of the enterprise 101. Employees of the enterprise 101 use the client devices 101 to access entries in one or more documents stored by the document management system 103.

Accessing entries in documents stored by the document management system 103 allows users to view existing entries in the document, add new entries to the documents, modify existing entries in the documents, and/or delete existing entries in the document. In one embodiment, the client device 107 may include an application that allows interaction with the document management system 103 to access documents stored by the document management system. The application may be a dedicated application specifically designed (e.g., by the organization responsible for the document management system 103) to enable interactions with the document management system 103.

The document management system 103 manages one or more documents that store data related to the enterprise 101. Users of client devices 107 may access a document managed by the document management system 103. However, the document may be secured by the document management system 103 to restrict all or portions of the document as not all users should have access to all of the data included in the document. As will be further described below, the document management system 103 restricts the data in a manner that prevents a user from reverse engineering data from other data that is unsecured in the document.

Document Management System

Figure 2:
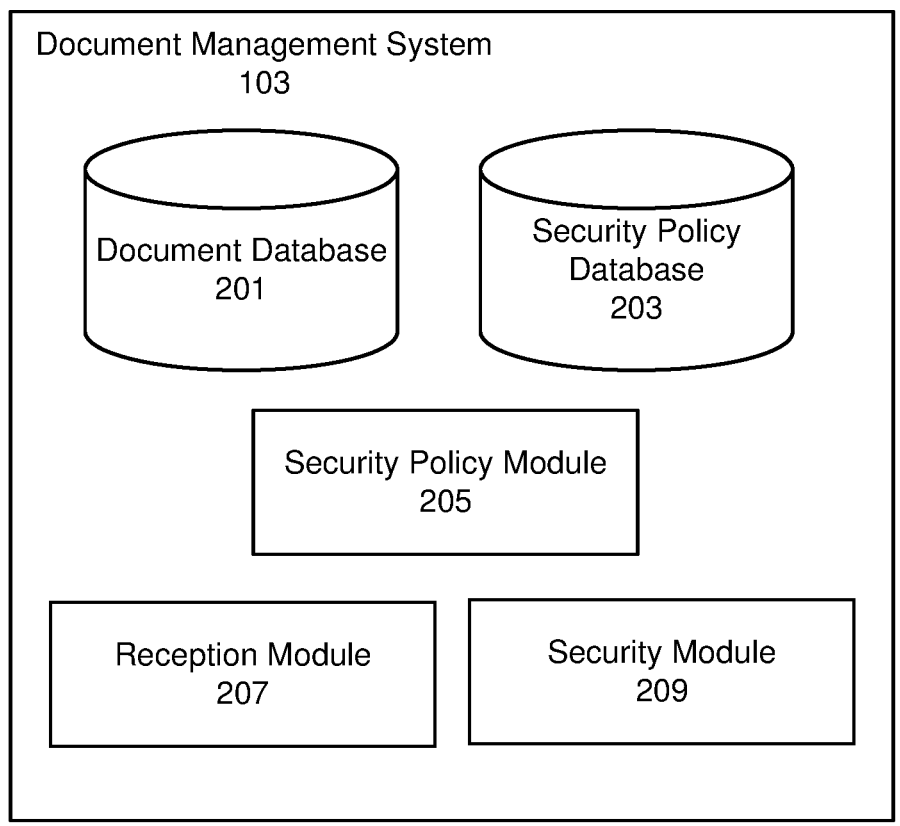
FIG. 2 is a high-level block diagram illustrating a detailed view of a document management system, according to one embodiment.

FIG. 2 is a high-level block diagram illustrating a detailed view of the document management system 103 of FIG. 1. In one embodiment, the document management system 103 includes a document database 201, a security policy database 203, a security policy module 205, a reception module 207, and a security module 209. Note that in other embodiments, the document management system 103 may include other modules and/or databases than those illustrated in FIG. 2.

The document database 201 stores one or more documents of the enterprise 100. An example of a document stored in the document database 201 is a ledger that includes data related to the enterprise 101. The ledger may include multiple entries that are organized into groups of one or more journals and/or identifiers, for example. However, any organizational format may be used to organize data stored in a document.

FIG. 3 is an example document 300 according to one embodiment. FIG. 3 illustrates a list view of a plurality of entries included in the document 300. As shown in FIG. 3, the entries included in the document 300 are arranged in a series of rows. For example, the document includes entries 301A to 301C arranged in separate rows. Each entry 301 includes a plurality of fields and a corresponding value for each field.

In one embodiment, each entry shown in the list view of entries shown in FIG. 3 is selectable to access a detailed view of the entry. Selecting an entry from the list view results in a display of a detailed view of the entry. FIG. 4 is an example of a detailed view of an entry according to one embodiment. The detailed view 400 of the entry is unrestricted in that all of the data included in the entry is viewable. The entry may include postings 401 shown in FIG. 4.

In one embodiment, one or more of the values included in the list view of entries of the document shown in FIG. 3 or the detailed view of an entry shown in FIG. 4 may be sensitive data. In one embodiment, sensitive data is data that should not be accessible to all users of the document management system 101. In other words, sensitive data should only be accessible by users who are authorized to access the sensitive data.

Referring back to FIG. 2, in one embodiment the security policy database 203 stores security polices used to secure documents managed by the document management system 103 to protect sensitive data in the documents from unauthorized users. In one embodiment, a security policy defines access restrictions for a document associated with the security policy.

The security policy module 205 may generate a security policy for a document that includes one or more security rules that specify the access restrictions for the document. The security policy module 205 receives a definition for each security rule to include in the security policy from a representative of the enterprise 100.

In one embodiment, a security policy can include different security rules based on the identifiers and/or journals associated with the security rules. A definition of the security rule may specify a particular destination in a document that is associated with the security rule. In one embodiment, the destination describes a particular identifier or journal associated with the security rule.

In one embodiment, the definition for a security rule for a particular destination in the document may also define an access type for the destination to restrict access to entries for the destination. The access type for the security rule is selectable from a plurality of different access types. The different access types include a first access type that grants privileges to post entries to the destination, a second access type that restricts viewing and searching of entries of the destination, and a third access type that restricts posting of entries to the destination.

A security rule further defines the entities that are subject to the security rule for the destination. In one embodiment, an entity may be a specific user (e.g., a name of the user or user identifier) that is subject to the access type of the security rule. In another embodiment, an entity in a security rule may specify a role type (i.e., occupation type) of a representative of the enterprise 101 that is subject to the access type of the security rule. For example, all representatives with the role type of a "clerk" at the enterprise 101 may be subject to the security rule. In yet another example, an entity in a security rule may specify a name of a group of users that are subject to the security rule. For example, all representatives who are in the "service" group may be subject to the security rule.

The security policy may also include a rule that prevents users from determining data from restricted entries through reverse engineering. The security policy may include a security rule that secures data that the security policy does not indicate is sensitive, but the data can be used to reverse engineer other sensitive data. For example, the security policy may include a security rule that secures any total values indicated in the document that can be used by a user to determine a specific value of sensitive data included in a restricted entry in the document.

Figure 5:
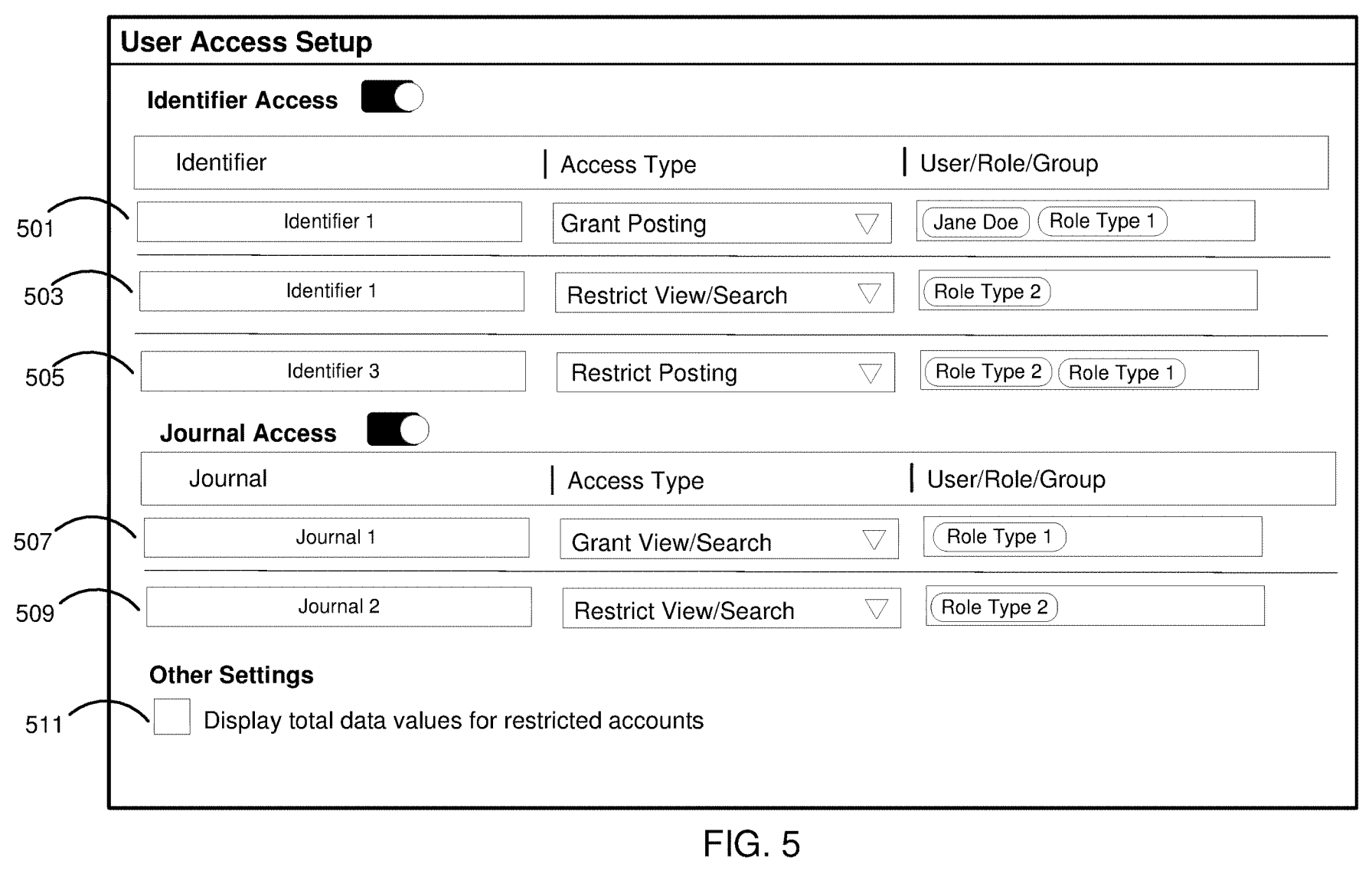

FIG. 5 shows a security policy example. The security policy may include three different rules 501 to 505 for identifiers 1 and 3. For example, rule 501 for identifier 1 specifies that only the user "Jane Doe" and users with a first role type are allowed to post entries in the document to identifier 1. Rule 503 defines access types for another entity to identifier 1 and so on. The security policy may also include rules 507 and 509 for journals 1 and 2.

The security policy also includes a rule 511 that allows showing of summed data values for restricted identifiers. By default, summed data values are masked in one embodiment to prevent reverse engineering of sensitive data. The representative that defines the security policy selects rule 511 to allow showing of summed data values.

Referring back to FIG. 2, the document management system 103 includes a reception module 207. The reception module 207 receives requests from client devices 107 to access a document stored by the document management system 103. The reception module 207 extracts request parameters from the request such as a destination of interest in the document (e.g., identifier or journal), a type of access request (e.g., view, add, modify, or delete), and attributes of the user (e.g., user identifier) that provided the request. The reception module 207 may forward the extracted request parameters to the security module 209.

In one embodiment, the security module 209 secures a document based on a security policy for the document. The security module 209 may secure a document by masking sensitive data included in the document to hide the sensitive data. Thus, the sensitive data is not viewable by users who are restricted from accessing the sensitive data.

The security module 209 may mask only portions of the document. For example, the security module 209 may mask sensitive data by replacing the sensitive data with a masking element and refrain from masking non-sensitive data in the document. A masking element that is used to replace sensitive data in the document may be an image (e.g., a lock image) or text that indicates that the sensitive data has been secured. Thus, a user with restricted access to the document may still receive the document, but the document is restricted such that only non-sensitive data is viewable by the user and sensitive data is masked.

FIG. 6 is an example of the document 300 from FIG. 3 that has been secured by the security module 209. In this example, a user has requested to view the entries for journal 1. The security module 209 determines that the user is restricted from viewing journal 1 according to the security policy for the document. Rather than preventing the user from viewing the document in its entirety, the security module 209 secures the document by replacing sensitive data included in the journal with a masking element 601 thereby hiding the sensitive data. Thus, the user is still able to view non-sensitive data included in entries of the document whereas the sensitive data is masked using the masking element 601.

Figure 7:
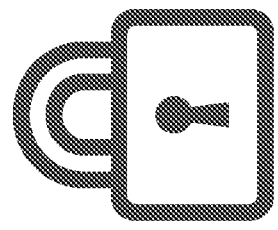
FIG. 7 is an example of a secured entry in the secured document according to one embodiment.

As mentioned above, an entry in the document is selectable in order to view a detailed view of entry. The security module 209 may also secure the detailed view of the entry according to the security policy. FIG. 7 is an example of the detailed view 400 of the entry shown in FIG. 4 that has been secured. As shown in FIG. 7, the security module 209 masks all of the data included in the entry by replacing the data with a notification 701 that access to the entry is restricted. The security module may mask all of the data if the security policy indicates that the user is restricted from viewing any entry associated with the journal.

In another example, the security module 209 may determine that access to the detailed entry may be allowed, but the data related to specific identifiers in the entry is restricted according to the security policy. In this scenario, the security module 209 masks the sensitive data included in the detailed entry as shown in FIG. 8. In the example of FIG. 8, data related to identifier 1 may be restricted according to the security policy and is replaced with a masking element 801A. As shown in FIG. 8, data related to identifier 3 is not restricted and is viewable by the user according to the security policy.

As mentioned above, the security policy may also include a security rule that prevents a user from determining the value of sensitive data that has been masked using other data that is viewable in the entry as the other data is not subject to a security rule in the security policy. Thus, the security module 209 may also mask data that may be used to reverse engineer the sensitive data. In the example shown in FIG. 8, the value of "data type 2" field may be a summed value of all of the identifiers in the entry and is not subject to a particular security rule in the security policy of the document. However, the value of the "data type 2" field may be used to determine the value of identifier 1. Accordingly, the security module 209 replaces the value of data type 2 field with masking element 801B to prevent reverse engineering of the restricted data for identifier 1.

The security module 209 determines whether to restrict a document using extracted parameters from the request from the reception module 207 and the security policy for the document. The parameters include the destination specified in the request, an access type, and an identifier of the user that submitted the request. From the identifier, the security module 209 may determine attributes of the user stored by the enterprise 101 such as the name of the user, role of the user in the enterprise 101, and a group that the user belongs to in the enterprise 101 in one embodiment.

The security module 209 compares the parameters of the request (e.g., the requested destination, the access type, and user attributes) with the security policy for the document to determine whether to restrict access or grant unrestricted access to the requested document. In one embodiment, all of the parameters of the request must match all of the parameters in at least one security rule in order for the security module 209 to secure the document. Thus, a partial match of a security rule would not cause the security module 209 to secure the document.

The security module 209 determines to restrict access to the document responsive to the parameters from the request entirely matching any of the security rules included in the security policy for the document. If a match is identified, the security module 209 applies the security rule associated with the complete match to the document to secure the document. The security module 209 then transmits the secured document to the reception module 207 to transmit to the client device 107. By transmitting the secured document, the user is granted partial access to the document. If a match is not identified, the security module 209 does not secure the document and provides the unsecured document to the reception module 207 to provide to the client device 107. Since a match is not identified, the user that submitted the request to access the document is granted access to all of the data included in the document.

Process for Securing a Document

Figure 9:
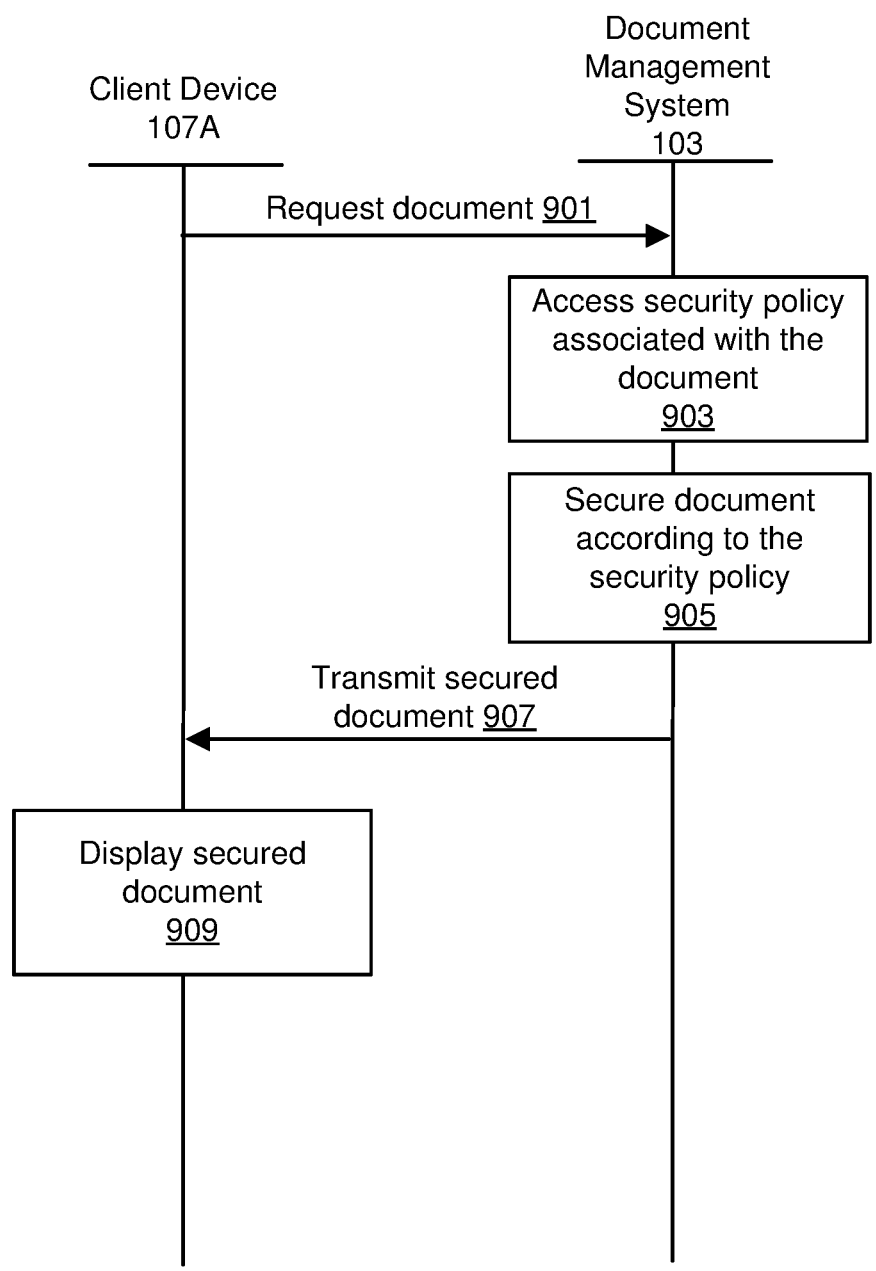
FIG. 9 is an interaction diagram illustrating a process of providing a secured document according to one embodiment.

FIG. 9 is an interaction diagram illustrating a process for securing a document according to one embodiment. In one embodiment, the client device 107A transmits 901 a request for a document 901 to the document management system 103. The request may include the destination of interest in the document, a requested access type, and an identifier of the user.

The document management system 103 accesses 903 a security policy associated with the document. The security policy includes one or more security rules that specify access restrictions for the document. The document management system 103 may secure 905 the document according to the security policy. The document management system 103 may secure the document by masking any sensitive data included in the document based on the security rules included in the security policy. The document management system 103 transmits 907 the secured document to the client device 107A. The client device 107A displays 909 the secured document. The secured document included a masking element that replaces sensitive data in the document, for example.

Alternate Document Management System Environment

FIG. 10 is a high-level block diagram illustrating an alternate embodiment of an environment 1000 of a document management system for securing documents of an enterprise. The environment 1000 is similar to the environment 100 shown in FIG. 1. The environment 1000 includes an enterprise 10001, a document management system 10003 and client devices 107. The entities in environment 1000 perform similar functions as their counterparts in environment 100 shown in FIG. 1 thus the description is omitted for readability.

However, in environment 1000 the document management system 1003 is separated from enterprise 1001. In the example of FIG. 10, a separate entity may be responsible for operating the document management system 1003 that manages documents on behalf of the enterprise. Alternatively, the same entity may be responsible for both the enterprise 1001 and the document management system 1003, but the document management system 1003 is separated from the enterprise 1001.

Hardware Components

Figure 11:
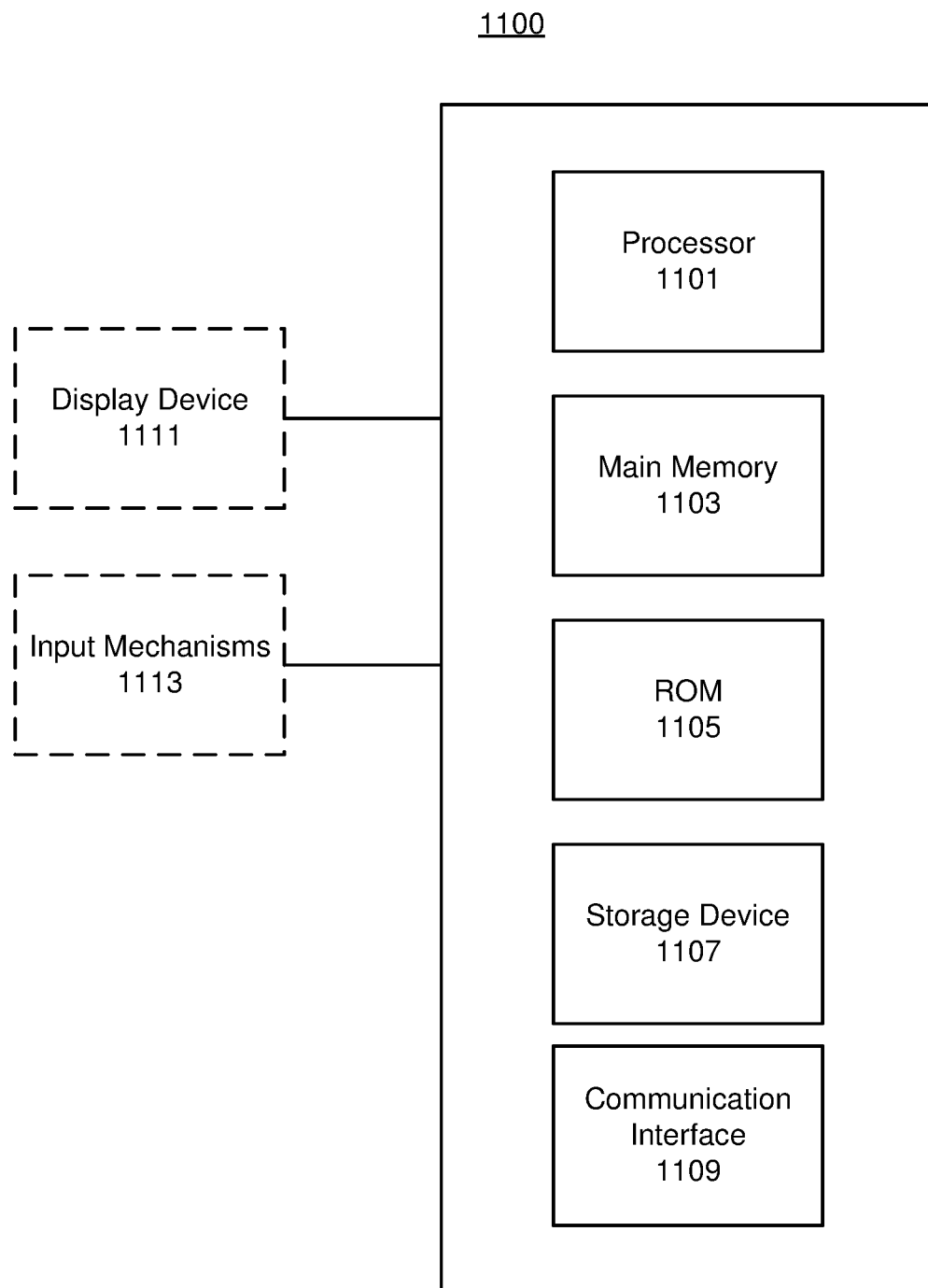
FIG. 11 is system diagram of a computer system, according to one embodiment.

FIG. 11 is a diagram illustrating a computer system 1100 upon which embodiments described herein may be implemented within the document management system 103/1003 and client devices 107. For example, in the context of FIG. 1, the document management system 103/1003 and client devices 107 may each be implemented using a computer system such as described by FIG. 11. The document management system 103/1003 may also be implemented using a combination of multiple computer systems as described by FIG. 1011.

In one implementation, the document management system 103/1003 and client devices 107 each include processing resources 1101, main memory 1103, read only memory (ROM) 1105, storage device 1107, and a communication interface 1109. The document management system 103/1003 and client devices 107 each include at least one processor 1101 for processing information and a main memory 1103, such as a random access memory (RAM) or other dynamic storage device, for storing information and instructions to be executed by the processor 1001. In one embodiment, multiple processors are employed by the document management system 103/1003 to perform the techniques described above in order to improve efficiency of the document management system 103/1003 and reduce computation time when securing documents. Main memory 1103 also may be used for storing temporary variables or other intermediate information during execution of instructions to be executed by processor 1101. The document management system 103/1003 and client devices 107 may each also include ROM 1105 or other static storage device for storing static information and instructions for processor 1101. The storage device 1107, such as a magnetic disk or optical disk or solid state memory device, is provided for storing information and instructions.

The communication interface 1109 can enable each of document management system 103/1003 and client devices 107 to communicate with each other through use of a communication link (wireless or wireline). Each of document management system 103/1003 and client devices 107 can optionally include a display device 1111, such as a cathode ray tube (CRT), an LCD monitor, an LED monitor, OLED monitor, a TFT display or a television set, for example, for displaying graphics and information to a user. An input mechanism 1113, such as a keyboard that includes alphanumeric keys and other keys, can optionally be coupled to the computer system 1100 for communicating information and command selections to processor 1101. Other non-limiting, illustrative examples of input mechanisms 1113 include a mouse, a trackball, touch-sensitive screen, or cursor direction keys for communicating direction information and command selections to processor 1101 and for controlling cursor movement on display device 1111.

Examples described herein are related to the use of the document management system 103/1003 and client devices 107 for implementing the techniques described herein. According to one embodiment, those techniques are performed by each of the document management system 103/1003 and client devices 107 in response to processor 1101 executing one or more sequences of one or more instructions contained in main memory 1103. Such instructions may be read into main memory 1103 from another machine-readable medium, such as storage device 1107. Execution of the sequences of instructions contained in main memory 1103 causes processor 1101 to perform the process steps described herein. In alternative implementations, hard-wired circuitry may be used in place of or in combination with software instructions to implement examples described herein. Thus, the examples described are not limited to any specific combination of hardware circuitry and software. Furthermore, it has also proven convenient at times, to refer to arrangements of operations as modules, without loss of generality. The described operations and their associated modules may be embodied in software, firmware, hardware, or any combinations thereof.

Reference in the specification to "one embodiment" or to "an embodiment" means that a particular feature, structure, or characteristic is included in at least one embodiment of the disclosure. The appearances of the phrase "in one embodiment" or "a preferred embodiment" in various places in the specification are not necessarily referring to the same embodiment.

Some portions of the above are presented in terms of methods and symbolic representations of operations on data bits within a computer memory. These descriptions and representations are the means used by those skilled in the art to most effectively convey the substance of their work to others skilled in the art. A method is here, and generally, conceived to be a self-consistent sequence of steps (instructions) leading to a desired result. The steps are those requiring physical manipulations of physical quantities. Usually, though not necessarily, these quantities take the form of electrical, magnetic or optical signals capable of being stored, transferred, combined, compared and otherwise manipulated. It is convenient at times, principally for reasons of common usage, to refer to these signals as bits, values, elements, symbols, characters, terms, numbers, or the like. Furthermore, it is also convenient at times, to refer to certain arrangements of steps requiring physical manipulations of physical quantities as modules or code devices, without loss of generality.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "displaying" or "determining" or the like, refer to the action and processes of a computer system, or similar electronic computing device, that manipulates and transforms data represented as physical (electronic) quantities within the computer system memories or registers or other such information storage, transmission or display devices.

Certain aspects disclosed herein include process steps and instructions described herein in the form of a method. It should be noted that the process steps and instructions described herein can be embodied in software, firmware or hardware, and when embodied in software, can be downloaded to reside on and be operated from different platforms used by a variety of operating systems.

The embodiments discussed above also relates to an apparatus for performing the operations herein. This apparatus may be specially constructed for the required purposes, or it may comprise a general-purpose computer selectively activated or reconfigured by a computer program stored in the computer. Such a computer program may be stored in a non-transitory computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The methods and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description below. In addition, the embodiments are not described with reference to any particular programming language. It will be appreciated that a variety of programming languages may be used to implement the teachings described herein, and any references below to specific languages are provided for disclosure of enablement and best mode.

While the disclosure has been particularly shown and described with reference to a preferred embodiment and several alternate embodiments, it will be understood by persons skilled in the relevant art that various changes in form and details can be made therein without departing from the spirit and scope of the invention.

What is claimed is:

1. A computer-implemented method of a management system for securing documents for an enterprise, the computer-implemented method comprising:
    storing a document including a plurality of entries, each of the plurality of entries including a plurality of data fields and a value for each of the plurality of data fields;
    storing a security policy associated with the document, the security policy including one or more security rules defining access restrictions to the document, the one or more security rules including a security rule to mask data included in the document that is not subject to any of the one or more security rules of the security policy, but is usable to determine the one or more values that are masked;
    receiving a request from a client device of a user to access an entry from the plurality of entries of the document;
    determining a first data field from the requested entry to be masked due to first data of the first data field being sensitive according to the one or more of the security rules included in the security policy;
    determining second data included in a second data field from the requested entry is non-sensitive due to not being subject to any of the one or more of the security rules included in the security policy, but the second data is to be masked due to the second data being usable to determine a value of the first data that is sensitive;
    securing the document according to the security policy by masking the first data that is sensitive and the second data that is non-sensitive such that the first data included in the first data field and the second data included in the second data field of the requested entry are hidden; and
    providing the secured document to the client device of the user, the secured document including the masked entry.

2. The computer-implemented method of claim 1, wherein storing the security policy comprises:
    receiving a definition for each of the one or more security rules included in the security policy, the definition for each of the one or more security rules including a destination in the document that is associated with the security rule, an access type that grants or restricts access to entries corresponding to the destination, and an entity to which the security rule is applicable.

3. The computer-implemented method of claim 2, wherein the access type includes at least one of a first access type that grants postings of new entries to the destination in the document, a second access type that restricts viewing and searching of entries associated with the destination, and a third access type that restricts postings of new entries to the destination in the document.

4. The computer-implemented method of claim 2, wherein the entity comprises at least one of a username, a name of an occupation type, and a name of a group of users.

5. The computer-implemented method of claim 2, further comprising:
    extracting from the request a destination associated with the requested entry, an access type for the requested entry, and user identifier from the request;
    comparing the extracted destination, the access type, and the user identifier with the security policy; and
    determining to secure the document according to the comparison.

6. The computer-implemented method of claim 1, wherein the secured document provided to the client device includes a list of a subset of the plurality of entries of the document, the list including the requested entry that is masked.

7. The computer-implemented method of claim 6, wherein the first data included in the first data field and the second data included in the second data field that are included in the masked entry are replaced with a masking element and remaining values of the plurality of data fields included in the masked entry are viewable.

8. The computer-implemented method of claim 6, further comprising:
    receiving a request from the client device to view a detailed view of the masked entry;
    determining that access to the detailed view of the masked entry is restricted according to the security policy; and
    providing a restriction notification to the client device according to the determination.

9. The computer-implemented method of claim 6, further comprising:
    receiving a request to view a detailed view of the masked entry from the client device;
    determining that access to the detailed view of the masked entry is partially restricted according to the security policy;
    securing the detailed view of the masked entry by masking one or more values of a plurality of data fields included in the detailed view of the masked entry; and
    providing the secured detailed view of the masked entry to the client device of the user.

10. A system for securing documents, comprising:
    one or more computer processors; and a non-transitory computer-readable storage medium storing executable computer program instructions, the instructions when executed by the one or more computer processors cause the one or more computer processors to perform steps comprising:
  storing a document including a plurality of entries, each of the plurality of entries including a plurality of data fields and a value for each of the plurality of data fields;
  storing a security policy associated with the document, the security policy including one or more security rules defining access restrictions to the document, the one or more security rules including a security rule to mask data included in the document that is not subject to any of the one or more security rules of the security policy, but is usable to determine the one or more values that are masked;
  receiving a request from a client device of a user to access an entry from the plurality of entries of the document;
  determining a first data field from the requested entry to be masked due to first data of the first data field being sensitive according to the one or more of the security rules included in the security policy;
  determining second data included in a second data field from the requested entry is non-sensitive due to not being subject to any of the one or more of the security rules included in the security policy, but the second data is to be masked due to the second data being usable to determine a value of the first data that is sensitive;
  securing the document according to the security policy by masking the first data that is sensitive and the second data that is non-sensitive such that the first data included in the first data field and the second data included in the second data field of the requested entry are hidden; and
  providing the secured document to the client device of the user, the secured document including the masked entry.

11. The system of claim 10, wherein storing the security policy comprises:
  receiving a definition for each of the one or more security rules included in the security policy, the definition for each of the one or more security rules including a destination in the document that is associated with the security rule, an access type that grants or restricts access to entries corresponding to the destination, and an entity to which the security rule is applicable.

12. The system of claim 11, wherein the access type includes at least one of a first access type that grants postings of new entries to the destination in the document, a second access type that restricts viewing and searching of entries associated with the destination, and a third access type that restricts postings of new entries to the destination in the document.

13. The system of claim 11, wherein the entity comprises at least one of a username, a name of an occupation type, and a name of a group of users.

14. The system of claim 11, wherein the instructions when executed by the one or more computer processors further cause the one or more computer processors to perform steps comprising:
  extracting from the request a destination associated with the requested entry, an access type for the requested entry, and user identifier from the request;
  comparing the extracted destination, the access type, and the user identifier with the security policy; and
  determining to secure the document according to the comparison.

15. The system of claim 10, wherein the secured document provided to the client device includes a list of a subset of the plurality of entries of the document, the list including the requested entry that is masked.

16. The system of claim 15, wherein the first data included in the first data field and the second data included in the second data field that are included in the masked entry are replaced with a masking element and remaining values of the plurality of data fields included in the masked entry are viewable.

17. The system of claim 15, wherein the instructions when executed by the one or more computer processors further cause the one or more computer processors to perform steps comprising:
  receiving a request from the client device to view a detailed view of the masked entry;
  determining that access to the detailed view of the masked entry is restricted according to the security policy; and
  providing a restriction notification to the client device according to the determination.

18. The system of claim 15, wherein the instructions when executed by the one or more computer processors further cause the one or more computer processors to perform steps comprising:
  receiving a request to view a detailed view of the masked entry from the client device;
  determining that access to the detailed view of the masked entry is partially restricted according to the security policy;
  securing the detailed view of the masked entry by masking one or more values of a plurality of data fields included in the detailed view of the masked entry; and
  providing the secured detailed view of the masked entry to the client device of the user.

19. A non-transitory computer-readable storage medium storing executable computer program instructions, the instructions when executed by one or more computer processors cause the one or more computer processors to perform steps comprising:
  storing a document including a plurality of entries, each of the plurality of entries including a plurality of data fields and a value for each of the plurality of data fields;
  storing a security policy associated with the document, the security policy including one or more security rules defining access restrictions to the document, the one or more security rules including a security rule to mask data included in the document that is not subject to any of the one or more security rules of the security policy, but is usable to determine the one or more values that are masked;
  receiving a request from a client device of a user to access an entry from the plurality of entries of the document;
  determining a first data field from the requested entry to be masked due to first data of the first data field being sensitive according to the one or more of the security rules included in the security policy;
  determining second data included in a second data field from the requested entry is non-sensitive due to not being subject to any of the one or more of the security rules included in the security policy, but the second data is to be masked due to the second data being usable to determine a value of the first data that is sensitive;

securing the document according to the security policy by masking the first data that is sensitive and the second data that is non-sensitive such that the first data included in the first data field and the second data included in the second data field of the requested entry are hidden; and providing the secured document to the client device of the user, the secured document including the masked entry.

20. The non-transitory computer-readable storage medium of claim 19, wherein storing the security policy comprises:

receiving a definition for each of the one or more security rules included in the security policy, the definition for each of the one or more security rules including a destination in the document that is associated with the security rule, an access type that grants or restricts access to entries corresponding to the destination, and an entity to which the security rule is applicable.

\* \* \* \* \*